May 12, 1925.                                                           1,537,672
E. J. HIBNER
CHILD'S VEHICLE
Filed Feb. 14, 1923          2 Sheets-Sheet 2
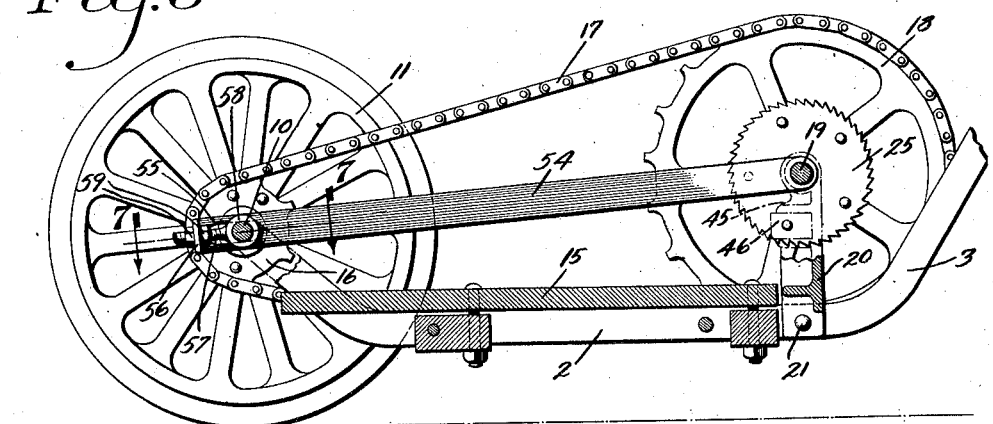
Fig.6
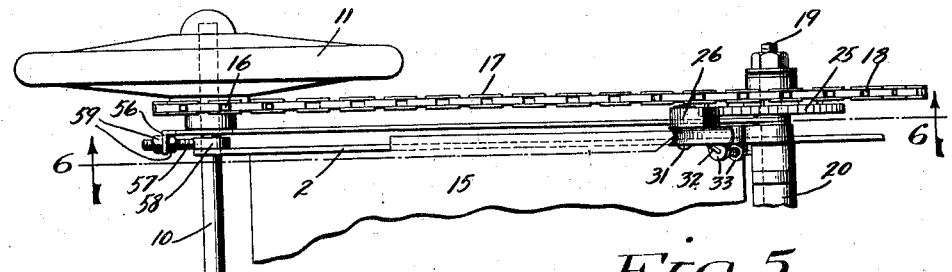
Fig.5
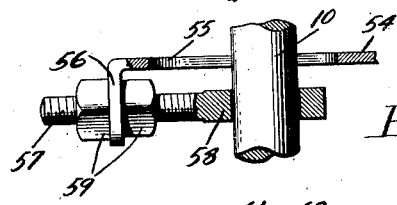
Fig.7
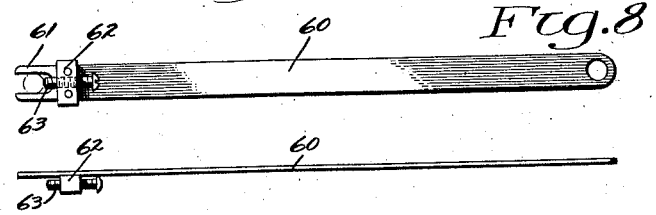
Fig.8
Fig.9
Inventor
Edward J. Hibner
By Wood & Wood
Attorneys Patented May 12, 1925.

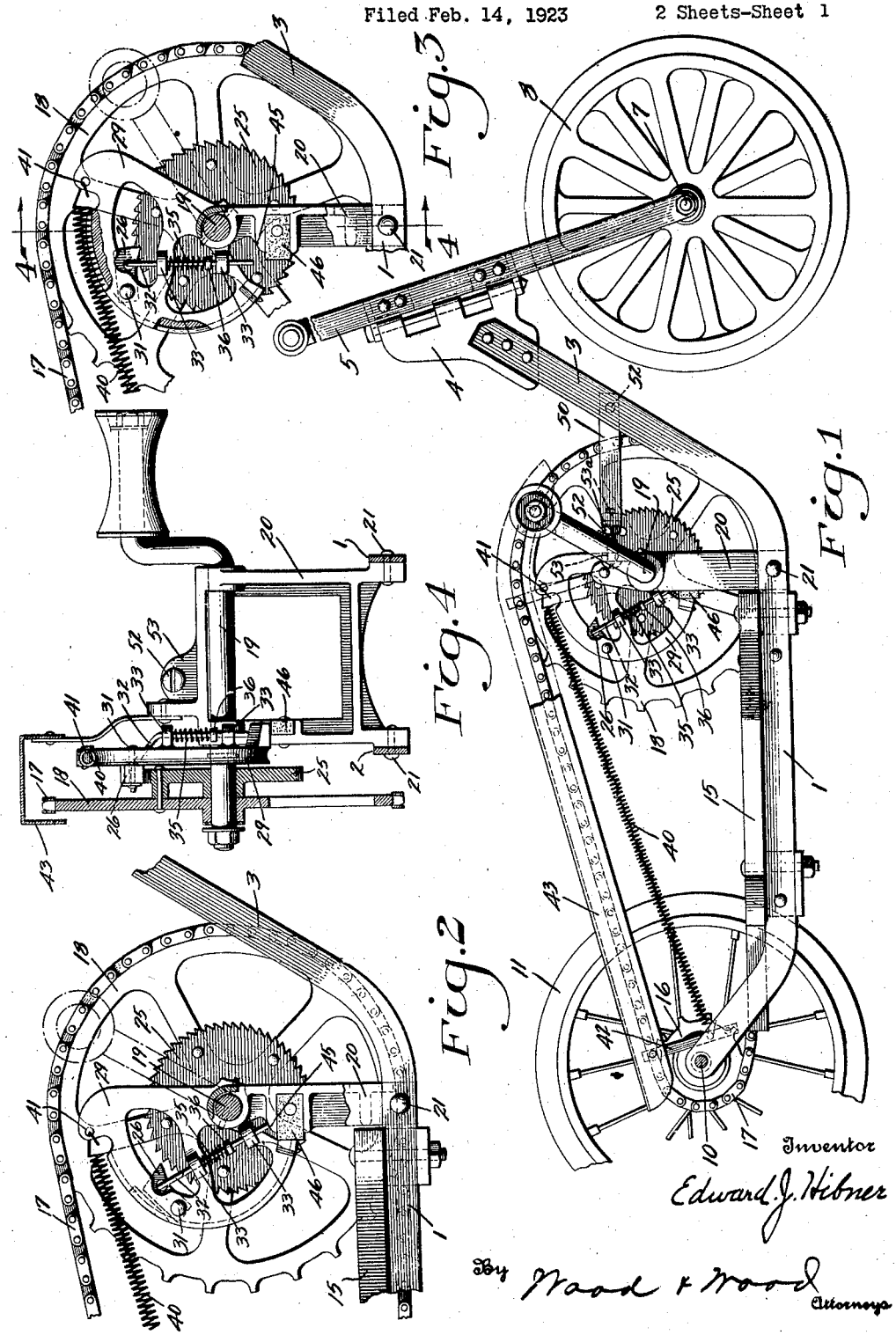

1,537,672

UNITED STATES PATENT OFFICE.

EDWARD J. HIBNER, OF HAMILTON, OHIO, ASSIGNOR TO CLARA A. HIBNER, OF NEW YORK, N. Y.

CHILD'S VEHICLE.

Application filed February 14, 1923. Serial No. 619,027.

*To all whom it may concern:*

Be it known that I, EDWARD J. HIBNER, a citizen of the United States, and residing at Hamilton, in the county of Butler and State of Ohio, have invented a new and useful Improvement in Children's Vehicles, of which the following specification is a full disclosure.

This invention relates generally to children's vehicles designed for propulsion by the operator when in standing position, and is particularly directed to improvements in the propulsion means and adjustment thereof, in a type of vehicle shown and described in a copending application Serial No. 494,070 for child's vehicle filed by me August 22, 1921. The vehicle herein, in its general structure, is similar to that shown in the above mentioned application, and reference therefore, will herein be made principally to the feature of the present invention.

The vehicle propulsion means comprises an oscillatable treadle conveying a pawl engaging with a ratchet wheel fixed to a sprocket wheel for transmitting motion to said wheel on the power stroke of the treadle. The sprocket wheel connects with a sprocket chain for driving a second sprocket wheel fixed or connecting with the driving wheel or wheels of the vehicle.

An object of the invention is to provide means for holding the pawl disengaged from the ratchet wheel when the propelling mechanism or treadle is in its initial or full retreat position, thereby freeing the driven element of the vehicle for reverse motion. This object is accomplished by providing means for disengaging the pawl from its ratchet wheel engagement at each complete return stroke or retreat position of the treadle, the pawl immediately engaging a tooth of the ratchet wheel when the pedal is depressed for propelling the vehicle in a forward direction.

Another object of the invention is the provision of means for taking up slack in the sprocket chain and maintaining a fixed relation between the sprocket wheel shafts, which relation has heretofore been disturbed by the flexing of the vehicle frame under the weight of the operator.

This object is accomplished by mounting the foot-operated propelling mechanism on a shaft, in turn mounted at the top of a pedal frame pivoted to the vehicle frame, which pedal frame may be oscillated and disposed at any desired angle with reference to the vehicle frame, and to the sprocket carried by the traction wheel, means being provided for holding the frame rigidly in adjusted position, thus maintaining a fixed relation between the rear axle and propelling shaft.

Other objects and certain advantages will be more fully set forth in the description of the accompanying drawings forming a part of this application, in which:

Figure 1 is a side elevation of a one-pedal velocipede embodying the features of this invention.

Figure 2 is a fragmentary enlarged detail view showing the improved ratchet mechanism in its initial position with the pawl disengaged from the teeth of the ratchet wheel.

Figure 3 is a view similar to Fig. 2 showing the pawl engaging a tooth of the ratchet wheel during propelling stroke.

Figure 4 is a vertical section on line 4—4, of Fig. 3.

Figure 5 is a fragmentary plan of a portion of the mechanism of Fig. 1, illustrating a modification of the means for adjusting the angular relation of the pivoted propulsion frame relative to the vehicle frame for taking up slack in the sprocket chain.

Figure 6 is a fragmentary longitudinal section on line 6—6 of Fig. 5, further illustrating the structure and manner of connecting the means of Fig. 5.

Figure 7 is a detail section on line 7—7 of Fig. 6, showing the adjusting means.

Figures 8 and 9 are respectively face and edge views of an additional modified form of combined chain tightener and vehicle brace.

The vehicle is composed of an underslung frame formed of steel members 1, 2, having convergent front ends 3 which are upturned, and spread, and have secured therebetween a swivel-block 4 to which is pivotally attached the steering post 5, for supporting an axle 7 and wheel 8. The frame members are upwardly turned and spread at the rear, the outer ends of the same being traversed by an axle 10 supporting the rear wheels, one a traction wheel 11, the traction wheel being loose upon the axle. Upon the underslung frame portion is secured a driving platform 15 which is of sufficient dimension to allow the operator to propel the vehicle, when in standing position.

The rear traction wheel 11 has attached thereto a sprocket 16 which is connected by a chain 17 with a sprocket 18, located forwardly of the platform, the sprocket being supported on a crank shaft 19 suitably rotatably mounted at the top of a U-shaped pedal frame 20, the lower ends of said frame being pivoted at 21 between the frame members 1 and 2. This construction permits of the oscillation of the frame about the pivot 21 for taking up slack in the chain 17. The sprocket 18 is loose upon the shaft 19 and has attached thereto a ratchet wheel 25 engageable by a pawl 26 carried by a rotative segment 29 rigidly attached to the shaft 19. The pawl 26 is pivoted at 31 to said segment and is loosely traversed by a lateral terminal extension of a pawl operating rod 32 slidable in lugs 33, integral with the segment 29. A spring 35 is interposed between one of the lugs and a stop 36 upon the rod, the action of the spring tending to lower the pawl for engagement with the teeth of the ratchet wheel 25, whereby upon the forward propelling stroke of the shaft 19 the pawl will be engaged with a tooth of said wheel, which wheel, by its connection with the sprocket 18, and through chain 17, and sprocket 16, will propel the vehicle in a forward direction. In order to allow the vehicle to be backed, means is provided for disengaging the pawl from the teeth of the ratchet wheel when the pedal is in its initial non-operating position, to which position it is forced after each propelling stroke by a normalizing spring 40 attached as at 41 at one end of the segment 29 and at its rear to the axle or, in this instance, to a brace 42 attached to the frame and supporting the chain guard 43. In order to disengage the pawl when the pedal or oscillating mechanism is in its normal or retreat position, an inclined lug 45 is provided at one side of the U-frame 20 against which the lower end of the rod 32 impinges, (see Fig. 2), sliding the rod in its lug bearings and disengaging the pawl, thus permitting the vehicle to be backed.

As shown in Fig. 2, the lower end of the rod 32 is in engagement with the lug and consequently the pawl is disengaged from its ratchet wheel.

In Fig. 3, the pawl-carrying segment has been rotated through a portion of its propelling arc, the lower end of the rod has been disengaged from its lug 45, and the spring actuated pawl has been forced into operative engagement with its ratchet wheel. A rubber bumper 46 is provided in the U-frame 20, an extension being provided on the lower side of the pawl-carrying segment for engagement with said cushion.

In order to take up slack in the sprocket chain 17, a tension member 50 in the form of a flat rod is attached as at 52 to the upturned ends 3 of the vehicle frame, the rod having an angular portion at its opposite end loosely traversed by the shank of a screw 52, which shank traverses a lug 53 of the frame 20, and has lock nuts 53$^a$, one at each side of the extension. By adjustment of the nuts upon the threaded shank the proper tension of the chain may be obtained.

A modified form of chain adjusting and vehicle frame brace is shown in Figures 5 to 7 inclusive, designed to take up slack in the sprocket chain 17, and to maintain a fixed relation between the shaft 19 and the rear axle 10 thereafter. A tension and brace member 54 is connected between said shaft and axle, one end of the rod being traversed with the shaft 19 and the opposite end of the rod having an elongated opening 55 slidably traversed by the rear axle 10. The rear extremity of the rod is bent at a right angle as at 56 to provide an extension traversed by a tension adjusting member 57, having a head 58 engaged about the axle 10. Jam nuts 59 are provided and are engaged with the threaded portion of the adjusting member at each side of the extension 56. By manipulating the adjusting member by means of the nuts, the bar may be thrust forwardly or rearwardly to respectively tighten and loosen the chain, the adjusted relation being thereafter positively maintained.

In Figures 8 and 9 are shown another form of tension rod 60, having a slotted rear end 61, engageable over the axle and provided with a lug 62 traversed by an adjustment screw 63, the shank end of which is adapted to abut the axle. When the screw is turned to the right the chain will be tightened.

Having described my invention, I claim:

1. In a treadle propelled vehicle, a vehicle frame having two rear wheels and a front steering wheel, a single treadle operable crank shaft journaled upon the frame, a pawl and ratchet propelling mechanism operable by said crank shaft, a rod connected with the pawl for disengaging the pawl from its ratchet, a stop engageable by the rod, at the end of the retreat stroke of said pawl and crank shaft, for disengaging the pawl, and chain transmission means connecting said ratchet mechanism with one of the rear wheels.

2. In combination with a vehicle having a frame, a rear axle and two rear wheels thereon, one a tractor wheel, and having a front steering wheel, vehicle propelling means mounted upon a U-frame, said U-frame pivoted to said vehicle frame, said propelling means comprising a shaft, rotative at the non-pivoted end of said U-frame, a pedal and crank for operating said shaft, a drive sprocket at one end of said shaft and a ratchet wheel rotatable with said sprocket, a pawl-carrying segment rotatable by said shaft, a pawl pivoted upon said segment adapted to engage with said ratchet wheel, means for retracting said segment and pedal after each propulsion stroke, a rod engaged with said pawl, a spring for normally causing the pawl to engage the ratchet wheel, and a stop on said frame engageable by said rod for holding the pawl from engagement with its ratchet wheel when the segment and pedal are in their initial inoperative position.

3. In combination with a three-wheel vehicle, comprising a frame having a rear axle and two rear wheels thereon, one a tractor wheel, and a front steering wheel, means for propelling said vehicle, said means mounted upon a frame pivoted to said vehicle frame and including a propelling shaft at the upper end of said pivoted frame, a sprocket wheel loose upon said shaft, a ratchet wheel rotative with said sprocket wheel, a spring retractable oscillative element movable with said shaft and having a pawl thereon engageable with said ratchet wheel, a spring-pressed rod engaged at one end with said pawl for normally causing the same to engage said ratchet wheel, and a stop upon said frame engageable by the opposite end of said rod when said propelling means is in non-operative condition for disengaging said pawl from said ratchet wheel.

4. In combination with a three wheeled vehicle comprising a frame having a rear axle and two rear wheels, one a tractor wheel, and a front steering wheel, means mounted upon the frame for the direct propulsion of the tractor wheel, including a propelling shaft rotatably mounted, a sprocket wheel loose upon the shaft, a ratchet wheel rotatable with the sprocket wheel, a spring retractable oscillative element movable with the shaft having a pawl thereon engageable with the ratchet wheel, a spring pressed rod engaged at one end with the said pawl for normally causing the same to engage said ratchet wheel, a stop upon the frame engageable by the opposite end of the rod when said propelling means is in non-operative condition, for disengaging the pawl from the ratchet wheel, and independently mounted stop means for limiting reverse shaft rotation.

5. In combination with a vehicle having a frame, a rear axle and two rear wheels thereon, one a tractor wheel and having a front steering wheel, vehicle propelling means mounted upon the vehicle frame comprising a propelling crank shaft rotatably mounted, adapted for foot operation, a driving sprocket rotatable upon the shaft having a ratchet wheel rotatable therewith, a pawl advanceable with and by the shaft, means for reversely rotating or retracting the shaft after each forward or propulsion rotation, a rod engaged with the pawl, a spring for normally causing the pawl to engage the ratchet wheel, and an independently mounted stop engageable by the rod for holding the pawl from engagement with the ratchet wheel when the shaft is in retracted or initial inoperative position.

In witness whereof, I hereunto subscribe my name, as attested by the two subscribing witnesses.

EDWARD J. HIBNER.

Witnesses:
R. KISTNER,
L. A. BECK.